(12) United States Patent
Kim et al.

(10) Patent No.: US 11,115,187 B2
(45) Date of Patent: Sep. 7, 2021

(54) APPARATUS AND METHOD FOR BLOCK CIPHERS FOR REAL-TIME DATA TRANSMISSION

(71) Applicant: KOREA UNIVERSITY RESEARCH AND BUSINESS FOUNDATION, Seoul (KR)

(72) Inventors: Hwangnam Kim, Seoul (KR); Seounghwan Oh, Seongnam-si (KR); Seongjoon Park, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 304 days.

(21) Appl. No.: 16/424,005

(22) Filed: May 28, 2019

(65) Prior Publication Data

US 2020/0084021 A1    Mar. 12, 2020

Related U.S. Application Data

(60) Provisional application No. 62/728,078, filed on Sep. 7, 2018.

(30) Foreign Application Priority Data

Nov. 23, 2018    (KR) ........................ 10-2018-0145919

(51) Int. Cl.
   *H04L 9/06*    (2006.01)
   *H04L 9/08*    (2006.01)
   (Continued)

(52) U.S. Cl.
   CPC .......... *H04L 9/0637* (2013.01); *H04L 9/0819* (2013.01); *H04L 9/14* (2013.01); *H04L 9/3273* (2013.01)

(58) Field of Classification Search
   CPC .................................................... H04L 9/0637
   See application file for complete search history.

(56) References Cited

U.S. PATENT DOCUMENTS

| | | | | |
|---|---|---|---|---|
| 5,673,319 A | * | 9/1997 | Bellare | ................ H04L 9/0637 380/259 |
| 2004/0019782 A1 | * | 1/2004 | Hawkes | ................ H04L 9/0637 713/161 |
| 2010/0169645 A1 | * | 7/2010 | McGrew | ............... H04L 9/3242 713/170 |

FOREIGN PATENT DOCUMENTS

| KR | 10-2013-0042440 A | 4/2013 |
|---|---|---|
| KR | 10-1683051 B1 | 12/2016 |

(Continued)

OTHER PUBLICATIONS

Korean Office Action for corresponding Korean application No. 10-2018-0145919 dated Apr. 2, 2020, citing the above references.

(Continued)

*Primary Examiner* — Simon P Kanaan
(74) *Attorney, Agent, or Firm* — Hauptman Ham, LLP

(57) ABSTRACT

The present disclosure relates to a block cipher apparatus and method for real-time data transmission and the block cipher apparatus according to an exemplary embodiment of the present disclosure includes: a block encryption unit which selects a key in accordance with an order of keys having different lengths to encrypt each plaintext block and generate a ciphertext block; and a message authentication unit which generates a message authentication code using a key selected at the time of encrypting a current plaintext block which is encrypted in the block encryption unit and a previous message authentication code generated by a plaintext block before the current plaintext block.

8 Claims, 7 Drawing Sheets

(51) Int. Cl.
    *H04L 9/32*         (2006.01)
    *H04L 9/14*         (2006.01)

(56) References Cited

FOREIGN PATENT DOCUMENTS

| | | |
|---|---|---|
| KR | 10-2017-0097294 A | 8/2017 |
| KR | 10-2018-0007974 A | 1/2018 |

OTHER PUBLICATIONS

Youtao Zhang et al., SENSS: Security Enhancement to Symmetric Shared Memory Multiprocessors, Proceedings of the 11th Int'l Symposium on High-Performance Computer Architecture, 2005, cited in NPL No. 1.

\* cited by examiner

FIG. 6

Adversary $A^{E_k}(LR(...,b))$ $M_0 \leftarrow 0^n \| 1^n$;
$M_1 \leftarrow 0^n \| 0^n$;

$C[1]C[2] \leftarrow E_k(LR(M_0, M_1, b))$

If $C[1] = C[2]$ then return 1 else return 0

$E_k(LR(M_l, M_r, b))$ $\begin{cases} E_k(M_l) \text{ if } b = 1 \\ E_k(M_r) \text{ if } b = 0 \end{cases}$ C[i] denotes the i-th block of a string C.

In the right word, $C[1]C[2] = E_k(0^n) \| E_{k'}(0^n)$ and $E_k(0^n)$ is not equal to $E_{k'}(0^n)$
In the left word, $C[1]C[2] = E_k(0^n) \| E_{k'}(0^n)$ and $E_k(0^n)$ is not equal to $E_{k'}(0^n)$ $\text{Adv}_{SE}^{IND-CPA}(A) = 0 - 0 = 0$, Because of different key

FIG. 7

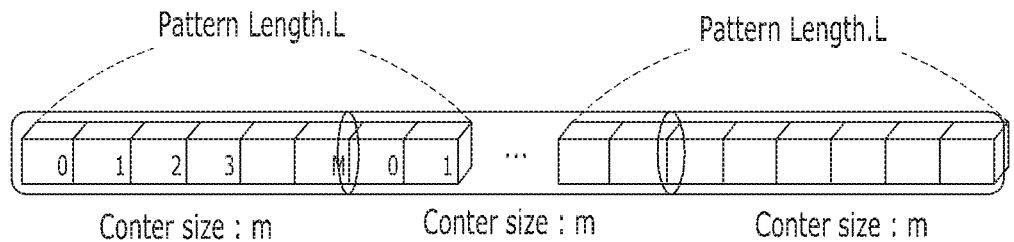

APPARATUS AND METHOD FOR BLOCK CIPHERS FOR REAL-TIME DATA TRANSMISSION

CROSS-REFERENCE TO RELATED APPLICATIONS

This application claims the priority of Korean Patent Application No. 10-2018-0145919 filed on Nov. 23, 2018, in the Korean Intellectual Property Office, and the priority of U.S. Application No. 62/728,078 filed on Sep. 7, 2018, in the USPTO, the disclosures of which are incorporated herein by references.

BACKGROUND

Field

The present disclosure relates to an apparatus and a method for block ciphers for real-time data transmission, and more particularly, to an apparatus and a method for block ciphers for real-time data transmission which select keys in accordance with an order of keys having different lengths to encrypt each plaintext block so as to allow a recipient to verify that an attacker replaces or forges a ciphertext transmitted from a sender.

Description of the Related Art

A cryptography does not have much meaning in itself. However, when a message exchanged under a communication situation is important data having personal information, it is important to protect the information of the data so as not to be exposed, so that the cryptography is necessary. Such a cryptography includes a symmetric key cryptography and an asymmetric key cryptography. Generally, the symmetric key cryptography is based on a structural complexity and a key length of the symmetric key cryptography is shorter than a key length of the asymmetric key cryptography so that encryption/decryption may be quickly performed. In contrast, the asymmetric key cryptography is based on a mathematical complexity (discrete logarithm problem) and separates public keys and private keys to encrypt and decrypt the public keys and the private keys, respectively. That is, since in the symmetric key cryptography, the encryption and decryption are performed with one key, the symmetric key cryptography has a problem in that the sender and the recipient need to securely share the symmetric key in advance. However, in the case of the asymmetric key cryptography, the public key and the private key are separated so that there is no need to exchange the keys. Therefore, it is advantageous in that when the sender encrypts an important message with a public key of the recipient and then transmits the important message, the recipient decrypts the ciphertext with its own private key to identify the message information. SSL/TLS well utilizes advantages and disadvantages of symmetric/asymmetric key cryptography in a network communication environment.

SSL which is an abbreviation of a secure socket layer is a protocol operating in an application layer and a TCP/IP layer for stable cryptographic communication between a web server and a web browser and is developed by Netscape. A formal name by ISO standard is transport layer security (TLS). In the TLS, a task for securely sharing the symmetric key therebetween through a handshaking protocol is performed before the communication. After sharing necessary information such as asymmetric/symmetric key cryptography available during the handshaking process and a hash type, the sender encrypts a symmetric key which will be used for the communication for the future with a public key of the recipient using a predetermined asymmetric key cryptography and transmits the symmetric key to the recipient. The recipient decrypts the ciphertext received from the sender with a secret key to securely obtain the symmetric key. By doing this, in the TLS, secure communication allowed by complementing the disadvantages of the asymmetric key cryptography and the symmetric key cryptography.

However, the security of the TLS protocol depends on the security of the cryptography, but does not complement the security of the asymmetric/symmetric key cryptography to be used. Further, the TLS is disadvantageous because it cannot appropriately adjust the real-time characteristic and the security in accordance with a network situation.

In today's modern society where security and the real-time characteristic become important due to the usage of IoT and wearable devices, when an encryption module of the related art such as TLS is applied to the device, overhead and delay may be generated. That is, if the real-time characteristic can be provided, the security is threatened and in contrast, if the security can be provided, the real-time characteristic is lowered.

Further, a cryptography for providing the security to the network communication environment includes stream ciphers, a symmetric key cryptography, and an asymmetric key cryptography. In the asymmetric key cryptography, basically, a key length is long so that a high security is provided, but the real-time characteristic cannot be provided. In contrast, according to the stream ciphers, since a ciphertext is generated by a simple XOR operation, it is possible to predict a plaintext with a probability of 50% so that the real-time characteristic may be provided, but the security cannot be provided. A key length of the symmetric key cryptography is longer than that of the asymmetric key cryptography, so that the symmetric key cryptography is fast and the symmetric key cryptography is securer than the stream cipher. Therefore, balanced security and real-time characteristic may be ensured as compared with any other cryptography. The symmetric key cryptography includes ARIA, SEED, and AES and each has three key lengths. The longer the key length, the higher the security provided. However, the delay is caused due to the encryption/decryption, so that the real-time characteristic may be lowered. In addition, as a quantum computer appears, the symmetric key cryptography of the related art having a short key length cannot ensure the security so that only when the symmetric key cryptography having the longest key length is used, the security may be ensured.

In order to solve the above problems, in the related art, a symmetric key cryptography having a long key length is used for the security and also the user randomly divides an area to which the cryptography is applied and an area to which the cryptography is not applied to provide the real-time characteristic. However, according to the method of the related art, in the area to which the cryptography not applied, the information is exposed as it is, and the method cannot be a fundamental solution in the network environment which requires the security and the real-time characteristic.

Therefore, it is required to develop a technology for a cryptography which may ensure the security and the real-time characteristic in an IoT device, an unmanned mobile object, and a vehicle network environment having resource limitations and computational limitations.

SUMMARY

An object to be achieved by the present invention is to provide an apparatus and method for block ciphers for real-time data transmission which are capable of providing security and real-time characteristic in an IoT device, an unmanned mobile object, and a vehicle network environment having resource limitations and computational limitations.

Technical objects of the present invention are not limited to the aforementioned technical objects and other technical objects which are not mentioned will be apparently appreciated by those skilled in the art from the following description.

According to an aspect of the present disclosure, a block cipher apparatus includes: a block encryption unit which selects a key in accordance with an order of keys having different lengths to encrypt each plaintext block and generate a ciphertext block and a message authentication unit which generates a message authentication code using a key selected at the time of encrypting a current plaintext block which is encrypted in the block encryption unit and a previous message authentication code generated by a plaintext block before the current plaintext block.

Desirably, the block cipher apparatus may further include: an input processing unit which divides a plaintext message into a plurality of ordered plaintext blocks having different bit lengths.

Desirably, when the ciphertext block has a predetermined size or larger, the block encryption unit may divide the ciphertext block into a header corresponding to a predetermined size and a tail corresponding to die rest, generate the header as a ciphertext block and add the tail with a next plaintext block to be block-encrypted.

Desirably, the message authentication unit may include an exclusive OR operating module which performs an exclusive OR (XOR) operation on the selected key and the previous message authentication code, a first hash module which encrypts the current plaintext block and a value obtained by the exclusive OR operating module with a first hash algorithm, and a second hash module which encrypts the value encrypted in the first hash module with a second hash algorithm to generate a message authentication code for the current plaintext block.

Desirably, the block cipher apparatus may further include a communication unit which transmits a ciphertext block and a message authentication code for the current plaintext block to a receiving device and the communication unit transmits a counter value for every ciphertext block together.

Desirably, the block cipher apparatus may further include a key generating unit which generates keys having different lengths used to encrypt each plaintext block in the block encryption unit and determines an order of the generated keys to set a pattern and the key generating unit sets the pattern in consideration of a network environment and data stability.

Desirably, the block cipher apparatus may further include a mutual authentication unit which shares at least one of a pattern in which orders of keys having different lengths are a public key, and a pre-master secret key with a receiving device through a handshaking process.

According to another aspect of the present disclosure, a block cipher method for encrypting a plaintext message as a block by a block cipher apparatus includes: sharing at least one of a pattern in which orders of keys having different lengths are set, a public key, and a pre-master secret key with a receiving device through a handshaking process; and generating a ciphertext block and a message authentication code by dividing the plaintext message into a plurality of plaintext blocks and selecting a key for each plaintext block in accordance with an order of the pattern.

Desirably, the block cipher method may further include: transmitting a ciphertext block and a message authentication code corresponding to each plaintext block to a receiving device.

According to the present disclosure, the PCB operation mode has an independent structure so that additional operation such as padding is not necessary. Therefore, the real-time characteristic may be achieved.

Further, the PCB may complement the security issue for a key length of the symmetric key cryptography of the related art through a pattern feature generated when keys having different lengths are simultaneously used so that a high level of security may be provided.

Therefore, the PCB according to the present disclosure may provide the security and the real-time characteristic to the device network environment having resource limitations and computational limitations such as IoT. Further, the PCB may also perform the decoding without causing error propagation also in an unmanned mobile object and the vehicle network environment where the packet loss may be easily caused due to the mobility. That is, the PCB operation mode is applied to a field with limitations such as resource limitations, computational limitations, and a property prone to packet loss due to the mobility so that the security and the real-time characteristic may be achieved.

The effects of the present disclosure are not limited to the technical effects mentioned above, and other effects which are not mentioned can be clearly understood by those skilled in the art from the following description

BRIEF DESCRIPTION OF THE DRAWINGS

The above and other aspects, features and other advantages of the present disclosure will be more clearly understood from the following detailed description taken in conjunction with the accompanying drawings, in which:

FIG. 6 is an algorithm for explaining an attack model of a PCB operation mode according to an exemplary embodiment of the present disclosure;

FIG. 7 is a view for explaining a counter value provided at every ciphertext according to an exemplary embodiment of the present disclosure;

DETAILED DESCRIPTION OF THE PREFERRED EMBODIMENT

Figure 1:
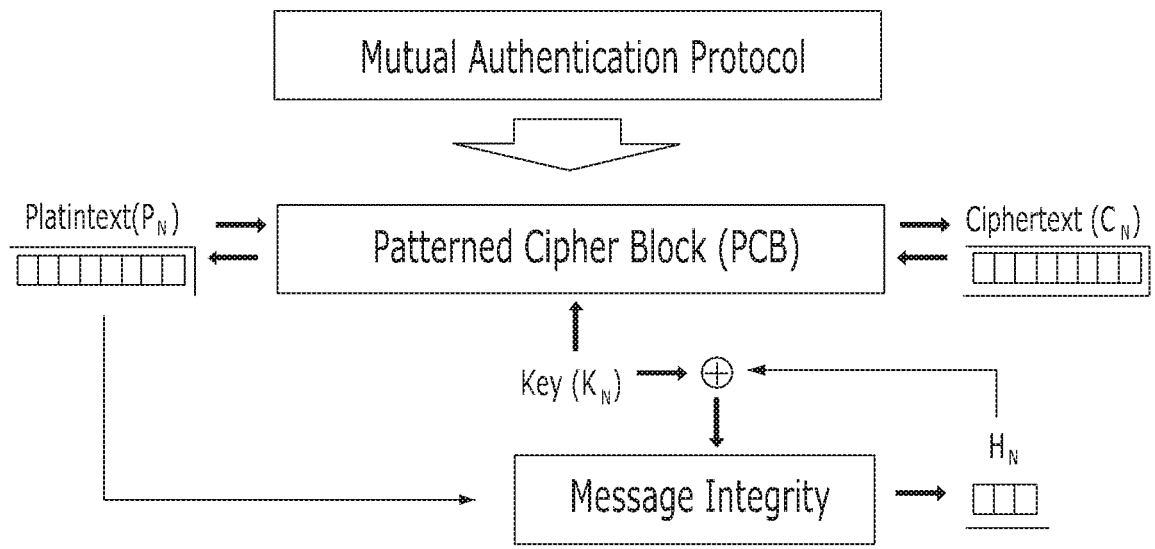
FIG. 1 is a view for explaining a concept of a block cipher for real-time data transmission according to an exemplary embodiment of the present disclosure.

Hereinafter, exemplary embodiments of the present disclosure will be described more fully with reference to the accompanying drawings for those skilled in the art to easily implement the present disclosure. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. Therefore, reference numerals which are used in previous drawings may be used for another drawing.

The size and thickness of the components shown the drawings are optionally determined for better understanding and ease of description, and the present disclosure is not limited to the examples shown in the drawings. In the drawings, thicknesses of several layers and regions are enlarged for clear expressions.

Hereinafter, an apparatus and a method for block ciphers for real-time data transmission according to an exemplary embodiment of the present disclosure will be described in more detail with reference to the accompanying drawings.

FIG. 1 is a view for explaining a concept of a block cipher for real-time data transmission according to an exemplary embodiment of the present disclosure.

Referring to FIG. 1, a block cipher for real-time data transmission according to an exemplary embodiment of the present disclosure is formed by a mutual authentication protocol which performs a mutual authentication process through challenge-response, a patterned cipher block (PCB) which selects a key in accordance with an order of the keys having different lengths to encrypt each plaintext block and generate a ciphertext block, and message integrity authentication which verifies a message integrity based on characteristics of a cryptographic hash function.

The mutual authentication protocol allows a sender and a recipient to share pattern information and keys through handshaking. According to the mutual authentication protocol, the key and the pattern information may be exchanged by two-round communication while securely performing a mutual authentication process through challenge-response. Here, the mutual authentication may identify the other party's identity and prevent the disguising of the attacker. Therefore, the challenge-response system needs to be built to be performed only by a user having a unique key.

The PCB having an independent structure encrypts symmetric keys having different lengths in accordance with a random order to have a pattern format and also allows a recipient to verify that an attacker replaces or forges a ciphertext transmitted from a sender.

Generally, in the symmetric key cryptography, the shorter the key length, the higher the real-time characteristic and the lower the security. Further, the longer the key length, the higher the security and the lower the real-time characteristic. However, the PCB according to the present disclosure simultaneously uses the symmetric keys having different lengths to adjust a ratio of keys having different lengths to allow the security and the real-time characteristic. Therefore, as compared with a related art that the user uses one key, when keys having different lengths are simultaneously used, it is securer. That is, the number of attempts of attacker's attack to decrypt arbitrary ciphertexts is increased and keys to be found are increased so that it is possible to provide a high level of security. Equation 1 may represent that a higher security than that of the related art can be provided.

$$S = A \times \frac{L!}{\prod_{i=0}^{N-1} n_i!} \quad \text{[Equation 1]}$$

Here, S is a total number of attempts to decrypt the ciphers of the PCB, L is a length of an entire block, A is a searching area of a pattern length (a range where the attacker arbitrary predicts a pattern), N is a total number, $n_i$ is a block encrypted with different key lengths.

As described above, the PCB is an operation mode in which several cryptographic algorithms are alternately used per block in the order of a given sequence called pattern. In the PCB operation mode, the sender and the recipient have the same pattern and use the same algorithm for each block to perform encryption and decryption. In this case, even though the attacker acquires ciphertexts, the attacker does not know a block set encrypted with the same key, so that the attacker cannot extract a shared key. The defense against the attacker brings an opportunity to improve the security and use a relatively fast encryption/decryption method, which may save time and cost.

Message integrity authentication allows the recipient to identify whether contents of the message are inappropriately falsified during the message transmission, thereby preventing the falsification by the attacker. That is, even though the cryptographic system used by the sender and the recipient is secure, in order to know that the attacker maliciously falsified or falsifies the ciphertext, a message authentication technique is necessary. Therefore, the message integrity authentication according to the present disclosure uses different cryptographic hash algorithms two times to prevent the falsification of the message from the attacker. That is, the message authentication is performed by performing an XOR operation for both a key Key($K_N$) used for the encryption and a message authentication code (an integrity authentication value) $H_N$ which is previously generated and obtains a result value using an XOR operation result value as an input value of the cryptographic hash algorithm. Therefore, the obtained result value is received as an input value of the cryptographic hash algorithm once again to generate an integrity authentication result value for the corresponding plaintext.

As described above, the message integrity authentication uses different cryptographic hash algorithms two times not only to prevent confliction of cryptographic hash functions, but also to make it impossible for an attacker to forge the message due to the cryptographic hash irreversibility characteristic.

The block cipher technique as described above not only provides an operation mode which encrypts the symmetric key cryptography suitable for the network environment but also provides the integrity authentication, so that it may be an authenticated operation mode technique.

Figure 2:
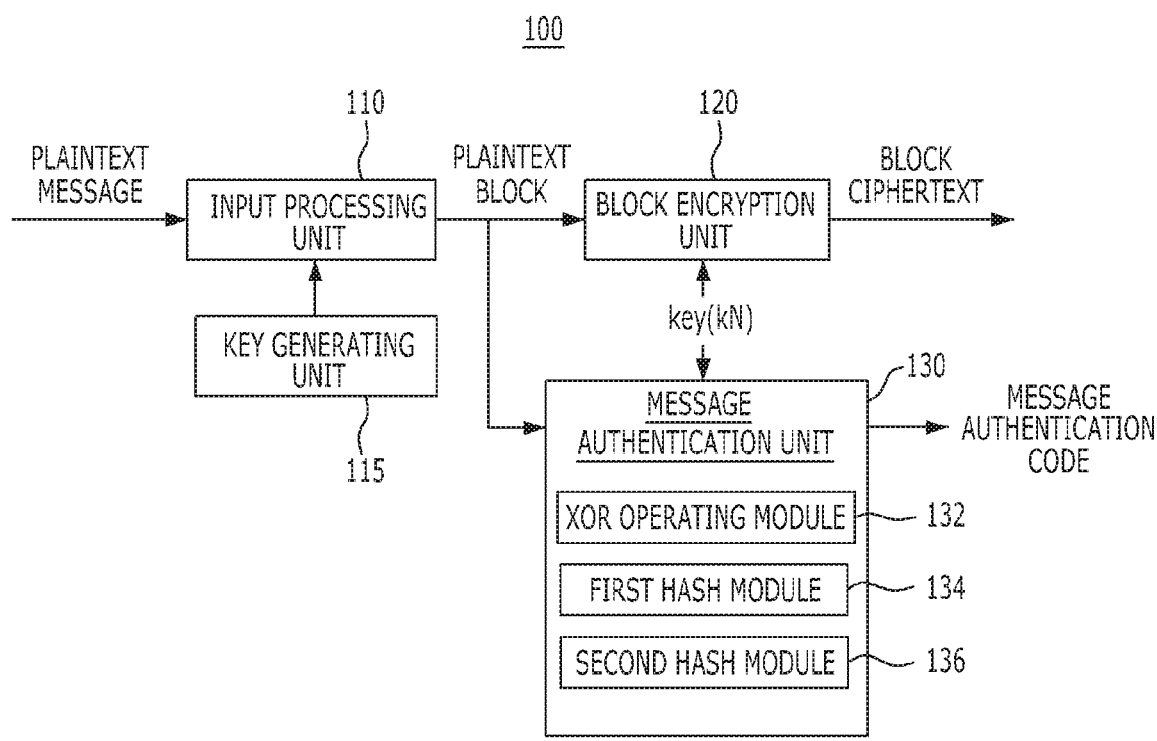
FIG. 2 is a block diagram for explaining a concept of a block cipher apparatus real-time data transmission according to an exemplary embodiment of the present disclosure.
Figure 3:
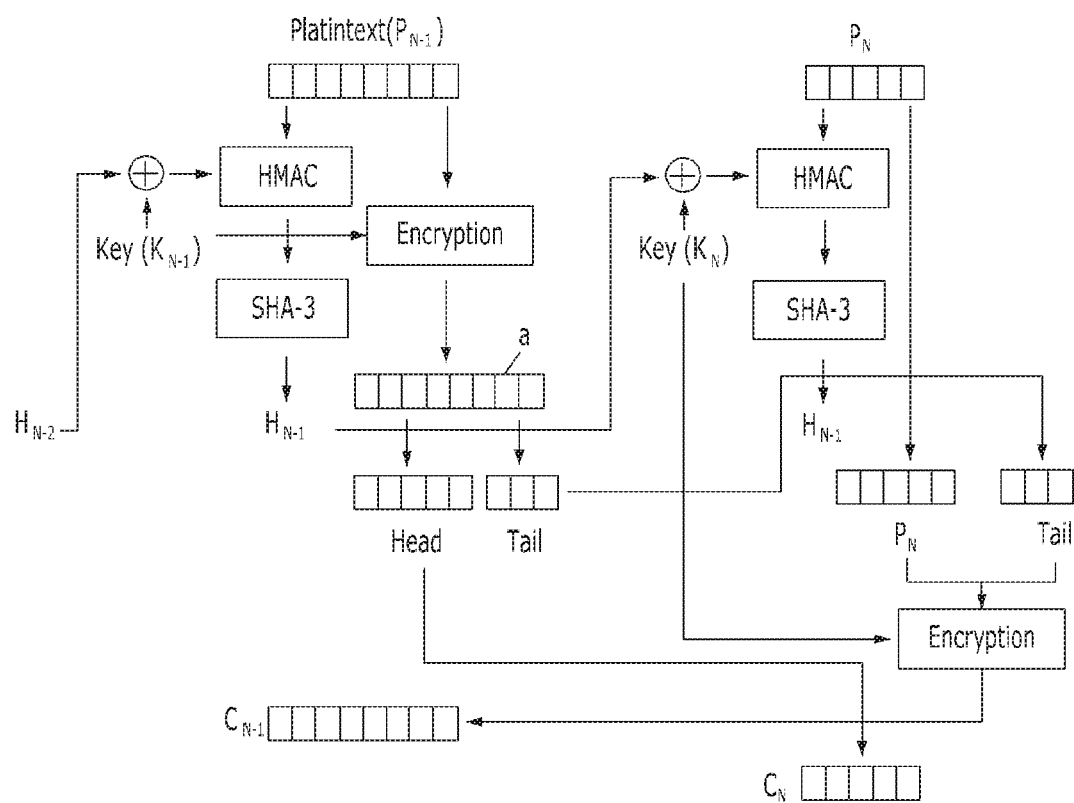
FIG. 3 is a view for explaining an operation of a block cipher apparatus for real-time data transmission according to an exemplary embodiment of the present disclosure.
Figure 4A:
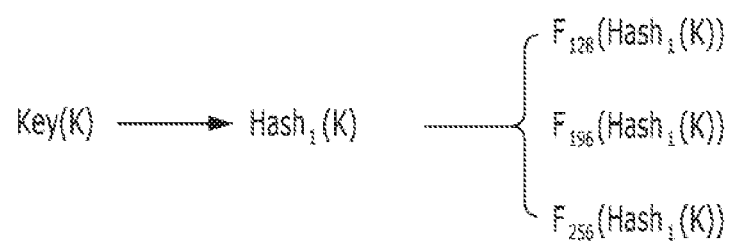
FIG. 4A and FIG. 4B are views for explaining a method for generating keys having different lengths used for a pattern type according to an exemplary embodiment of the present disclosure.
Figure 4B:
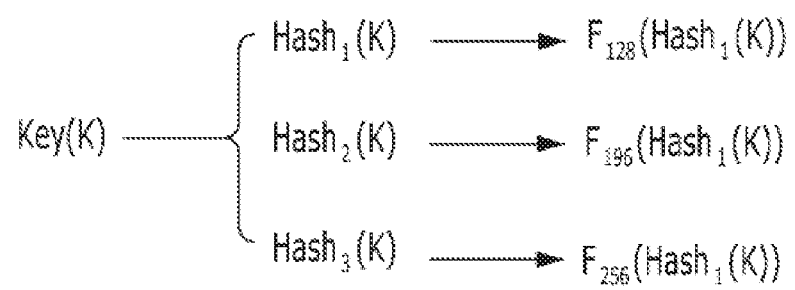
Figure 5A:
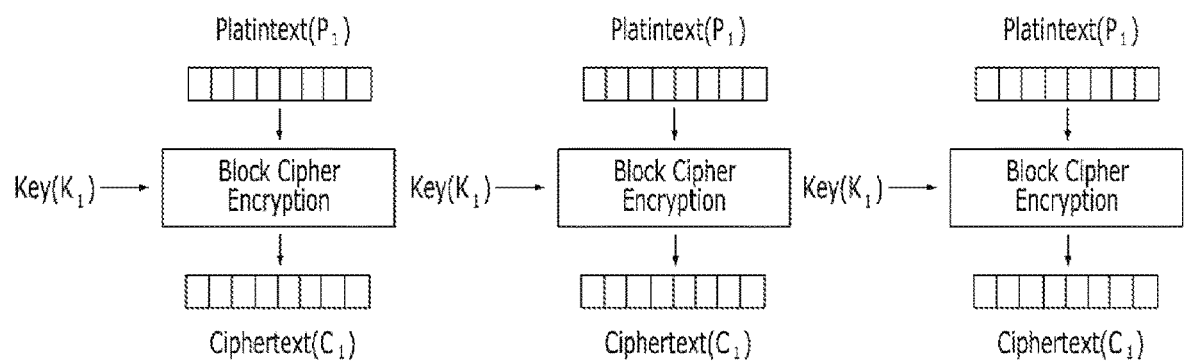
FIG. 5A and FIG. 5B are views for explaining ciphertexts generated by the same plaintext block according to an exemplary embodiment of the present disclosure.
Figure 5B:
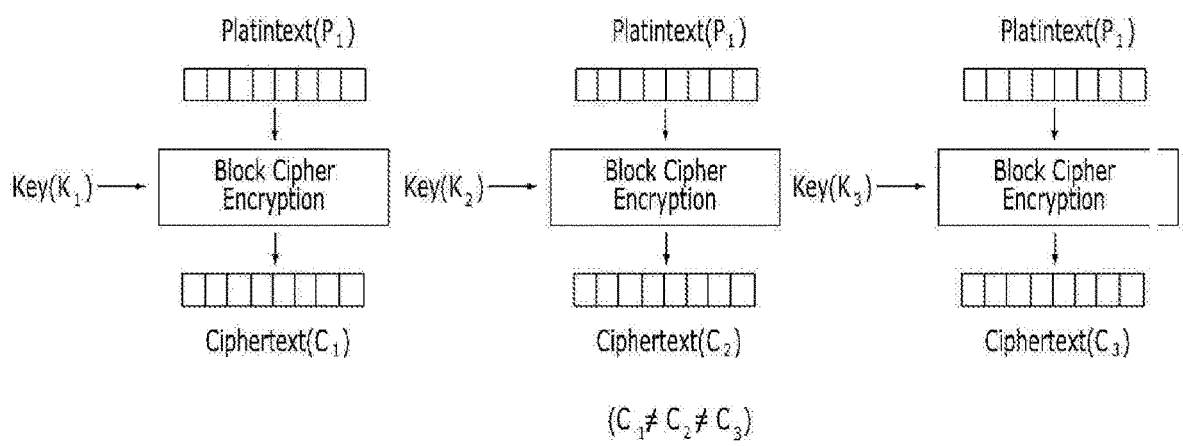

FIG. 2 is a block diagram for explaining a concept of a block cipher apparatus for real-time data transmission according to an exemplary embodiment of the present disclosure, FIG. 3 is a view for explaining an operation of a block cipher apparatus for real-time data transmission according to an exemplary embodiment of the present disclosure, FIG. 4A and FIG. 4B are views for explaining a method for generating keys having different lengths used for a pattern type according to an exemplary embodiment of the present disclosure, FIG. 5A and FIG. 5B are views for explaining ciphertexts generated by the same plaintext block according to an exemplary embodiment of the present disclosure, FIG. 6 is an algorithm for explaining an attack model of a PCB operation mode according to an exemplary embodiment of the present disclosure, and FIG. 7 is a view for explaining a counter value provided at every ciphertext according to an exemplary embodiment of the present disclosure.

Referring to FIG. 2, a block cipher apparatus 100 for real-time data transmission according to an exemplary embodiment of the present disclosure includes an input processing unit 110, a key generating unit 115, a block encryption unit 120, and a message authentication unit 130.

The input processing unit 110 divides an input plaintext message into a plurality of ordered plaintext blocks having different bit lengths. That is, the input processing unit 110 converts the plaintext message into a plurality of plaintext mocks $P_1, P_2, P_3, \ldots, P_{N-1}$, and $P_N$. In this case, the plurality of plaintext blocks may be blocks having the same bit length or different bit lengths. Further, the plaintext blocks need to be processed in a specific order so that the same order may be applied to a reverse process which aims at decrypting a ciphertext message. Therefore, the plaintext blocks are sequentially arranged.

The key generating unit 115 generates keys having different lengths used to encrypt the plaintext blocks in the block encryption unit 120 and determines the orders of the generated keys to set a pattern. In this case, the key generating unit 115 may set the pattern in consideration of the network environment and the data stability.

The PCB according the present disclosure simultaneously uses the symmetric keys having different lengths to adjust a ratio of keys having different lengths to ensure the security and the real-time characteristic. For the symmetric key cryptography, generally, three key lengths of 128 bits, 196 bits, and 256 bits are used in the PCB mode, different cipher indexes are allocated to keys having different lengths. Therefore, the key generating unit 115 may generate keys having different lengths used for encryption in the symmetric key cryptography using a method for generating three types of keys with PW, a method for cutting result values, obtained by inputting one PW using different three types of hash functions, in accordance with a bit to use the result values, and a method for randomly generating different three types of keys by a user. Here, the method for generating three types of keys with one PW is a method which cuts the result values obtained using the PW as an input value of the hash function in accordance with the bit to use the result value. The reason that the hash function is used is because even though the attacker finds out one hash result value, the attacker cannot find out the remaining hash result values due to the preimage resistance which is the property of the hash function. For example, as illustrated in FIG. 4A, a key K is input to the $Hash_1$ function to generate keys having different lengths such as $F_{123}(Hash_1(K))$, $F_{196}(Hash_1(K))$, and $F_{256}(Hash_1(K))$.

In the method for cutting result values obtained when one PW is input, in accordance with a bit to use the result values, using different three types of hash functions, the reason that three types of hash functions are used is to prepare a possible collision even though the hash function basically satisfies the collision resistance. For example, as illustrated in FIG. 4B, a key K is input to $Hash_1$ function, $Hash_2$ function, and $Hash_3$ function to generate $F_{123}(Hash_1(K))$, $F_{196}(Hash_2(K))$, and $F_{256}(Hash_3(K))$.

Finally, the method for randomly generating different three types of keys by a user may be the securest method.

As described above, the key generating unit 115 may generate keys having different lengths using various methods.

The block encryption unit 120 selects keys in accordance with the order of keys having different lengths to encrypt each plaintext block to generate a ciphertext block. In this case, the block encryption unit 120 may encrypt each plaintext block using DES, TripleDES, AES, or arbitrary different block cryptographic algorithm.

In the PCB mode, the sender and the recipient have the same information called pattern. This information is an integer sequence mapping to cryptographic algorithm and also referred to as a cryptic index. Therefore, the block encryption unit 120 encrypts each plaintext block using the cryptographic algorithm mapping to the cryptic index in accordance with the order of the pattern. In this case, if there are n available cryptographic algorithms (when there is a pre-master key of each key), when the length of the pattern is larger than n, a part or all the pattern is used in the PCB mode. Further, the plaintext block is independently encrypted using different key lengths, so that the plaintext and the ciphertext maintain one-to-one relationship.

For example, it is assumed that the plaintext blocks are $P_1, P_2, P_3, \ldots, P_{N-1}$, and and the patterns are set as a first key, a second key, a third key, a first key, a second key, a third key, a first key, a second key, and a third key. In this case, the block encryption unit 120 encrypts the plaintext block $P_1$ based on the first key, encrypts the plaintext block $P_2$ based on the second key, encrypts the plaintext block $P_3$ based on the third key, and encrypts the plaintext block $P_4$ based on the first key, so as to encrypt plaintext blocks using the key of a pattern order corresponding to the order of the plaintext blocks.

As described above, the block encryption unit 120 performs the encryption in accordance with keys having different lengths to have a pattern due to the order of the keys. Further, when the block encryption unit. 120 encrypts the same plaintext through a structural characteristic having a pattern format like CBC, different ciphertexts are generated. For example, the ECB as illustrated in FIG. 5A encrypts the same plaintext block $P_1$ using the same key to generate the same ciphertext and thus when the attacker obtains only the ciphertext, the attacker finds out that ciphertext of a specific plaintext is repeated. In contrast, the PCB as illustrated in FIG. 5B encrypts the same plaintext block $P_1$ using different keys, in accordance with the order set in the pattern, different ciphertexts are generated. As described above, the ECB mode is vulnerable to CPA attack model. However, the PCB has an independent structure which applies a patterned format so that the attack model of the ECB of the related art may be impossible. Generally, it is understood that the attack of the related art is impossible through LR Encryption Oracle. This may prove that the PCB may defend against the IND-CPA attack through an algorithm 1 of FIG. 6. In FIG. 6, $A^{E_k(LR(\cdots,b))}$ denotes adversary, MI denotes a plaintext, C[i] denotes a ciphertext.

As described above, the PCB has a pattern format, which uses different key lengths so that the same ciphertext for the same plaintext is not generated. Therefore, it is impossible for the attacker to analyze the existing pattern to reuse or decrypt the block.

Further, when the encrypted block is larger than a size of a previous plaintext block, the block encryption unit 120 divides the encrypted block into a header having the size of the previous plaintext block and a tail for the rest and generates the header as a ciphertext block and encrypts the tail together with a plaintext block of a subsequent stage as a block.

For example, referring to FIG. 3, since the result obtained by encrypting (N-1)-th plaintext P(N-1) using the key Key($K_{N-1}$) has a different size from the previous plaintext block, the block encryption unit 120 divides the encrypted result into a head and a tail in this case, the head may have a length corresponding to the size of the previous plaintext block and the tail may have a length of the rest. The block encryption unit 120 transmits the tail to the next stage to encrypt the tail together with the N-th plaintext $P_N$.

As described above, the block encryption unit 120 uses the encryption stealing technique so that it does not request additional padding task. Therefore, even though bit errors or loss are generated in some ciphertexts during the ciphertext transmission, the PCB may transmit the ciphertext in real-time without propagating the error.

The message authentication unit 130 generates a message authentication code using a key selected at the time of encrypting a current plaintext block which is encrypted in the block encryption unit 120 and an authentication code of a previous message generated by a plaintext block before the current plaintext block. For example, the message authentication unit 130 generates an N-1-th message authentication code $H_{N-1}$ using the key selected by the block encryption unit 120, the N-1-th plaintext block encrypted by the block encryption unit 120, and an N-2-th message authentication code $H_{N-2}$ generated by the N-2-th plaintext block before the N-1-th plaintext block.

The message authentication unit 130 uses a different cryptography hash algorithm two times to generate a message authentication code for preventing a falsification of a message by an attacker. That is, the message authentication unit 130 performs an XOR operation on both a key Key ($K_N$) used the encryption and a message authentication code (integrity authentication value) $H_N$ which is previously generated and obtains a result value using an XOR operation result value as an input value of a first cryptographic hash algorithm. Thereafter, the message authentication unit 130 uses the result value obtained through the first cryptographic hash algorithm as an input value of the second cryptographic hash algorithm to generate a message authentication code for the corresponding plaintext block.

The message authentication unit 130 includes an exclusive OR operating module 132, a first hash module 134, and a second hash module 136.

The exclusive OR operating module 132 performs an exclusive OR (XOR) operation on the key selected by the block encryption unit 120 and an N-2-th message authentication code $H_{N-2}$ generated by the N-2-th plaintext block before the N-1-th plaintext block encrypted by the block encryption unit 120. Referring to FIG. 3, the exclusive OR operating module 132 performs an exclusive OR operation on and a key Key ($K_{N-1}$) used for encryption of the N-1-th plaintext block $P_{N-1}$ in the block encryption unit 120 to output $K_{(N-1)} \oplus H_{(N-2)}$.

The first hash module 134 encrypts the N-1-th plaintext block $P_{N-1}$ and a value calculated in the exclusive OR operating module 132 with a first hash algorithm. In this case, the first hash module 134 may generate an MAC value using a hash-based message authentication code (HMAC).

The second hash module 136 encrypts the value encrypted in the first hash module 134 with a second hash algorithm. In this case, the second hash module 136 generates an N-1-th message authentication code $H_{N-1}$ using a secure hash algorithm 3 (SHA-3).

As described above, the message authentication unit 130 performs hash operations for each plaintext block two times. Therefore, when the plaintext message is divided into plaintext blocks, n message authentication codes corresponding to n plaintext blocks need to be generated and transmitted and 2n times hash operations are requested.

Even though the ciphertext encrypted using the PCB operation mode is secure, if the message integrity is not authenticated, the recipient does not recognize that the attacker deletes or replaces a part of the ciphertext during the communication. Therefore, the present disclosure uses a message integrity authentication which may be used together with a cryptographic stealing technique. When an N-1-th plaintext having a plaintext length N is $P_{(N-1)}$, the message authentication unit inputs $P_{(N-1)}$ and $K_{(N-1)} \oplus H_{(N-2)}$ as an input value of the HMAC algorithm and inputs an output value of the algorithm as an input value of the hash function SHA-3. Therefore, the block cipher apparatus 100 transmits the final output value $H_{(N-1)}$(=SHA (HMAC$_{K_{(N-1)} \oplus H_{(N-2)}}(P_{(N-1)})$)) and the ciphertext $C_{(N-1)}$ (=$E_{K_{(N-1)}}(P_{(N)}||Tail)$) generated in the block encryption unit 120 to the receiving device. Thereafter, when it is assumed that an N-th plaintext is $P_{(N)}$, the block cipher apparatus 100 performs the exclusive OR operation on $K_{(N)}$ and the hash value obtained through the previous plaintext block. The result obtained by the exclusive OR operation and $P_{(N)}$ are input as an input value of the HMAC algorithm and the output value of the algorithm is input as an input value of the hash function SHA-3. By doing this, the block cipher apparatus 100 transmits the final output value and a ciphertext obtained by encrypting the N-th plaintext block to the receiving device. As a result, the block cipher apparatus 100 transmits a message authentication code $H_i$(=SHA (HMAC$_{K_i \oplus H_{(i-1)}}(P_i)$)) together with the ciphertext $C_i$(=$E_{K_i}$ ($P_i$)) of each plaintext block to the receiving device to authenticate the message integrity. In the meantime, since the block cipher apparatus 100 according to the present disclosure has a structure in which a previous ciphertext affects the generation of a subsequent ciphertext in the form of chain, even though the attacker forges or replaces the ciphertext halfway through, the recipient may verify whether the ciphertext is transmitted from an actual sender through $H_i$. The security of the message integrity mechanism may be represented by three attributes of the cryptographic hash function. A first preimage resistance defines that it is difficult to find an input value which generates a hash value for a given hash value. A second preimage resistance defines that it is computationally infeasible to find another input value from an input value without changing a hash value for the input value. A third confliction resistance defines that is computationally difficult to find two input values which generate the same hash value. Therefore, the cryptographic hash function is a one-way function which cannot reproduce an original text through the hash value. Further, in consideration of previous SHA and HMAC security issues, SHA-3 and HMAC which are proven to be secure are used together to improve the security of the message integrity. In the meantime, the block cipher apparatus 100 according to the present disclosure further includes a mutual authentication unit (not illustrated). The mutual authentication unit allows the sender and the recipient to share public keys and patterns through a handshaking process.

That is, in order to encrypt the information and securely transmit pattern information, the sender and the recipient need to securely set a session through mutual authentication. Therefore, the mutual authentication unit uses a protocol which satisfies a secure mutual authentication process through challenge-response and prevents the attacker from disguising as a sender, through the protocol.

Further, the block cipher apparatus 100 according to the present disclosure may further include a communication unit (not illustrated) which transmits the ciphertext block generated in the block encryption unit 120 and the message authentication code generated in the message authentication unit 130 to the receiving device. In this case, the communication unit may transmit a counter value for every ciphertext block together.

In order to apply the actual PCB to the network environment, TCP or UDP characteristics of the network layer need to be considered. Differently from the TCP, when the UDP is used on the network layer, packet loss may be frequently caused. Therefore, when CBC or stream ciphers are used, error propagation may be generated or appropriate ciphertexts cannot be obtained. However, if a pattern length L is known, as illustrated in FIG. 6, the PCB may provide a counter size M for the ciphertext block to detect the packet loss and skip. Therefore, only lost blocks are retransmitted or ignored so that the PCB may be used in the UDP environment. That is, since the PCB has an independent structural characteristic, the PCB may provide a counter value for every ciphertext generated by the symmetric key cryptography as illustrated in FIG. 7. Therefore, in the network environment, not only in the TCP, but also in the UDP where the packet loss may be frequently caused, appropriate plaintexts may be obtained without causing the error propagation. Further, even though the packet loss is caused halfway through, the lost packet may be retransmitted through the counter value.

In the meantime, the block cipher apparatus 100 according to the present disclosure may be implemented by various forms such as dedicated hardware or CPU, a microprocessor, a micro controller, or a system on chip (SoC) and also implemented in the form of a combination of hardware and software. Further, the block cipher apparatus 100 may be implemented to be separated, like the blocks illustrated for description, but may also be implemented in the form of software in the same hardware or implement different functional blocks by reusing the same basic software block in the same hardware.

Figure 8:
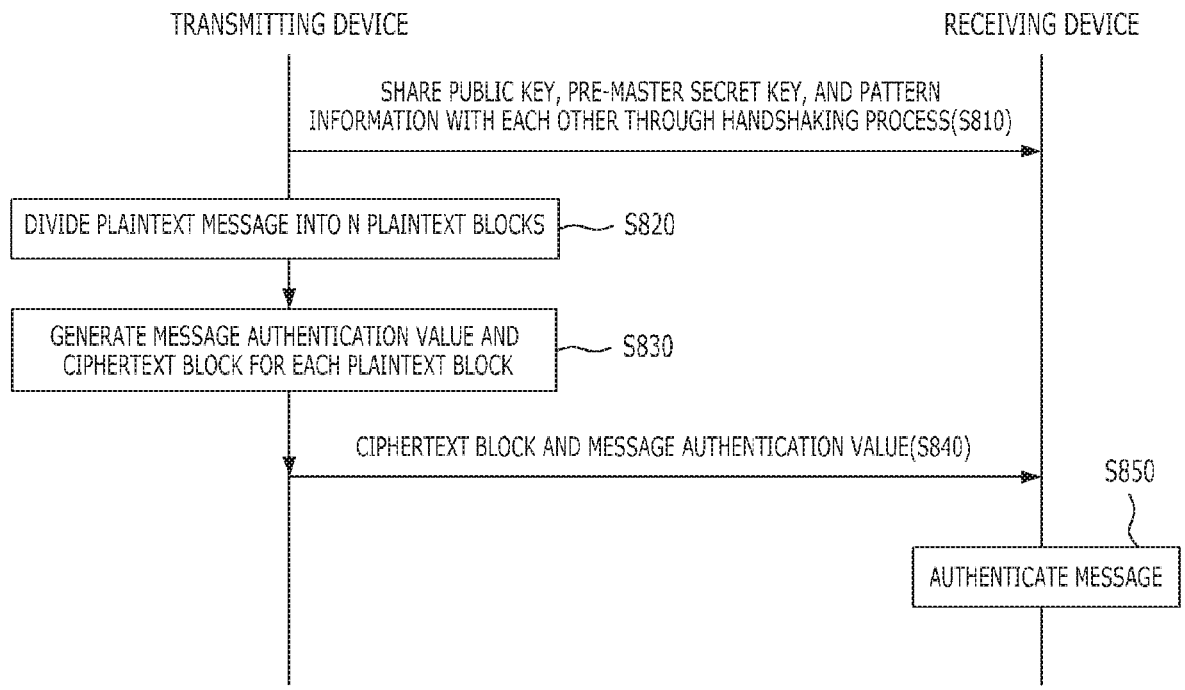
FIG. 8 is a view for explaining a block encryption and decryption method according to an exemplary embodiment of the present disclosure.

FIG. 8 is a view for explaining a block encryption and decryption method according to an exemplary embodiment of the present disclosure.

Referring to FIG. 8, a transmitting device and a receiving device share public keys, pre-master secret keys, and pattern information through a handshaking process in step S810. A mutual authentication method performed by the transmitting device and the receiving device will be described in detail with reference to FIG. 9.

When step S810 is performed, the transmitting device divides a plaintext message into N plaintext blocks in step S820 and generates a ciphertext block and a message authentication code for each plaintext block in step S830. That is, the transmitting device selects a key in accordance with an order of keys having different lengths to encrypt each plaintext block and generate a ciphertext block. Further, the transmitting device performs XOR operation on the key used to encrypt the corresponding plaintext block and a message authentication code previously generated, obtains a result value using the result value of the XOR operation and the corresponding plaintext block as an input value of a first cryptographic hash algorithm, and generates a message authentication code for the corresponding plaintext block using the result value as an input value of a second cryptographic hash algorithm.

When step S830 is performed, the transmitting device transmits the ciphertext block and the message authentication code corresponding to each plaintext block to the receiving device in step S840 and the receiving unit decrypts the plaintext block using the ciphertext block and the message authentication code and performs the message authentication in step S850.

Figure 9:
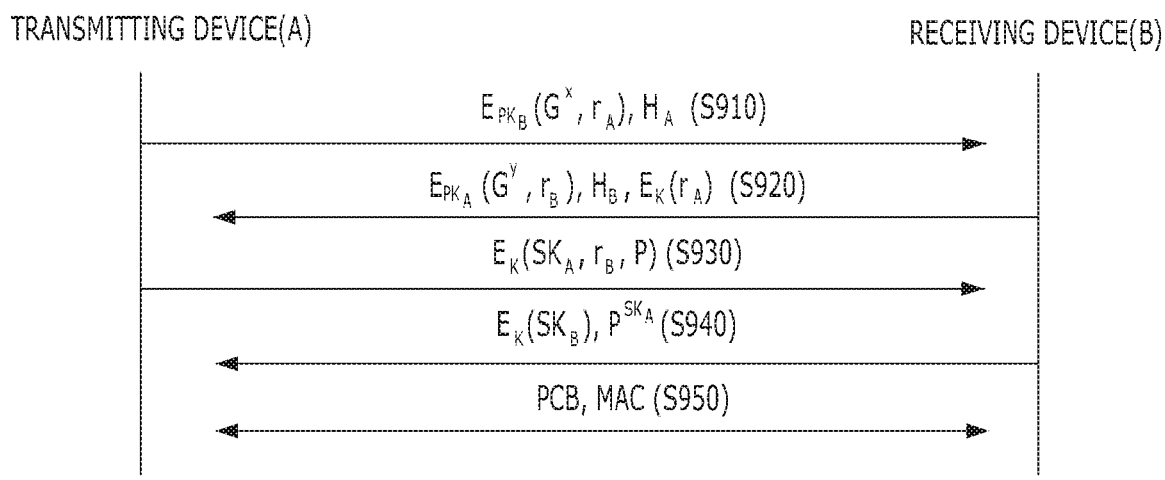
FIG. 9 is a view illustrating a mutual authentication method according to an exemplary embodiment of the present disclosure.

FIG. 9 is a view illustrating a mutual authentication method according to an exemplary embodiment of the present disclosure.

Referring to FIG. 9, the transmitting device encrypts a prime value $G^x$ using the public key $PK_B$ of the receiving device to transmit the prime value $G^x$ together with the random value $r_A$ and the message authentication code $H_A$ in step S910. That is, the transmitting device encrypts the $G^x$ using the public key $PK_B$ of the receiving device in order to generate a pre-master secret key and transmits $r_A$ to identify whether the receiving device is a correct recipient. Further, the transmitting device transmits the message authentication code $H_A$ to the receiving device to verify that it is transmitted by the transmitting device.

When step S910 is performed, the receiving device encrypts $G^y$ and $r_B$ with the public key PK of the transmitting device and encrypts $r_A$ received from the transmitting device with the pre-master secret key K and then transmits the encrypted values to the transmitting device together with the message authentication code $H_B$ in step S920. That is, the receiving device decrypts the ciphertext received from the transmitting device with own secret key SK to obtain $G^x$ and $r_A$ and generates the pre-master secret key K by $G^{xy}$ (mod N) operation. Thereafter, the receiving device encrypts $G^y$ and $r_B$ with the public key PK of the transmitting device and encrypts $r_A$ received from the transmitting device with the pre-master secret key K and then transmits the encrypted values to the transmitting device together with the message authentication code $H_B$.

When step S920 is performed, the transmitting device decrypts the ciphertext r received from the receiving device using the pre-master secret key K generated by itself to confirm that r is $r_A$ that is transmitted by itself and encrypts SK, $r_B$, and P with K to transmit the encrypted values to the receiving device in step S930. That is, the transmitting device decrypts the ciphertext received from the receiving device with its own secret key SK to obtain $G^y$ and $r_B$ and generates the pre-master secret key K through $G^{xy}$ (mod N) operation. Through the above-described process, the transmitting device and the receiving device may securely share the pre-master secret key K using Diffie-Hellman Key exchange. Thereafter, the transmitting device decrypts the ciphertext r received from the receiving device using the generated pre-master secret key K to confirm that r is $r_A$ that is transmitted by itself and encrypts SK, $r_B$, and P with K to transmit the encrypted values to the receiving device.

When step S930 is performed, the receiving device decrypts the ciphertext received from the transmitting device to verify r, verifies the message authentication code H obtained from the HMAC operation using the SK of the transmitting device, and transmits a ciphertext indicating that the receiving device correctly receives the pattern information to the transmitting device in step S940. In this case, the receiving device compares the $H_A$ which is previously received with H obtained through the HMAC operation to verify the message authentication code and transmits the ciphertext obtained by encrypting the SK of the transmitting device using K and $P^{SK}$ obtained by signing P with SK of the transmitting device, to the transmitting device, to notify that the receiving device correctly receives the pattern information P.

When step S940 is performed, the transmitting device identifies whether H obtained from the HMAC operation is identical to $H_B$ which is previously received using the SK of the receiving device obtained through the ciphertext received from the receiving device.

Through the above-described process, the transmitting device and the receiving device not only perform the mutual authentication, but also securely share the pre-master secret key and the pattern information in step S950.

Figure 10:
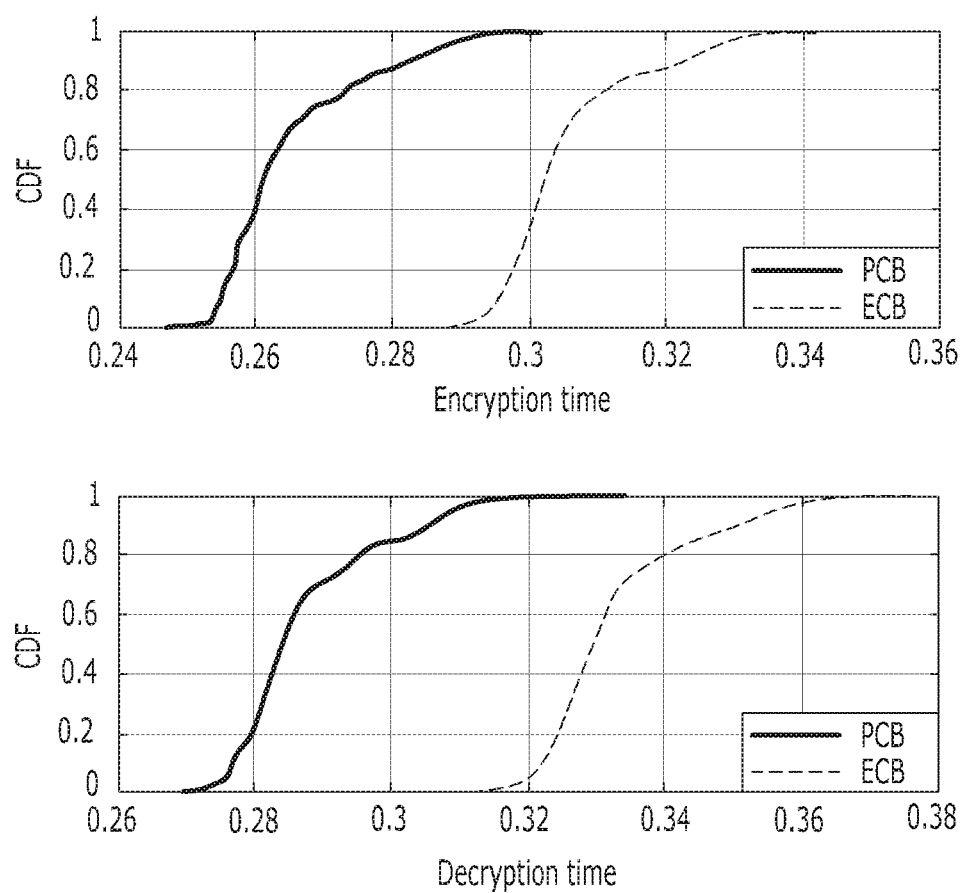
FIG. 10 is a graph obtained by comparing a performance of a PCB operation mode according to an exemplary embodiment of the present disclosure with an ECB operation mode.

FIG. 10 is a graph obtained by comparing a performance of a PCB operation mode according to an exemplary embodiment of the present disclosure with an ECB operation mode.

Referring to FIG. 10, it is confirmed that the PCB operation mode performs the encryption and description faster than the ECB which is the fastest method among the block unit cryptography. Basically, the PCB and the ECB have independent structures. However, unlike the ECB, the PCB may provide high security due to the pattern characteristic generated when keys having different lengths are simultaneously used. That is, the PCB complements the security issue for the key length of the symmetric key cryptography of the related art so that a high level of security is provided and the speed of performing the encryption and decryption is the highest. Therefore, it is possible to provide the real-time characteristic.

The referenced drawings and described detailed description of the present disclosure are exemplary of the present disclosure, which are used for the purpose of merely describing the present disclosure, not limiting the scope of the present disclosure which is included in the appended claims. Therefore, it will be appreciated to those skilled in the art that various modifications are made and other equivalent embodiments are available. Accordingly, the actual scope of the present disclosure must be determined by the spirit of the appended claims.

What is claimed is:

1. A block cipher apparatus, comprising:
    a key generating unit configured to generate keys having different lengths by entering a password into a hash function and set a pattern by generating an order of the generated keys;
    a block encryption unit configured to select a key, among the generated keys, in accordance with the order of the generated keys and generate a ciphertext block by encryting a plaintext block using the selected key; and
    a message authentication unit configured to generate a message authentication code using a key selected at the time of encrypting a current plaintext block which is encrypted in the block encryption unit and a previous message authentication code generated by a plaintext block prior to the current plaintext block,
    wherein when the generated ciphertext block has a predetermined size or larger, the block encryption unit divides the generated ciphertext block into a header corresponding to a predetermined size and a tail corresponding to the rest, generates the header as a ciphertext block, and adds the tail with a next plaintext block to be block-encrypted.

2. The block cipher apparatus according to claim 1, further comprising:
    an input processing unit configured to divide a plaintext message into a plurality of ordered plaintext blocks having different bit lengths.

3. The block cipher apparatus according to claim 1, wherein the message authentication unit includes:
    an exclusive OR operating module configured to perform an exclusive OR (XOR) operation on the selected key and the previous message authentication code;
    a first hash module configured to encrypt the current plaintext block and a value obtained by the exclusive OR operating module with a first hash algorithm; and
    a second hash module configured to encrypt the value encrypted in the first hash module with a second hash algorithm togenerate a message authentication code for the current plaintext block.

4. The block cipher apparatus according to claim 1, further comprising:
    a communication unit configured to tranmit a ciphertext block and a message authentication code for the current plaintext block to a receiving device,
    wherein the communication unit transmits a counter value for every ciphertext block together.

5. The block cipher apparatus according to claim 1 wherein the key generating unit sets the pattern in consideration of a network environment and data stability.

6. The block cipher apparatus according to claim 1, further comprising:
    a mutual authentication unit configured to share at least one of a pattern in which orders of keys having different lengths are set, a public key, and a pre-master secret key with a receiving device through a handshaking process.

7. A block cipher method for encrypting a plaintext message as a block by a block cipher apparatus, the method comprising:
    generating keys having different lengths by entering a password into a hash function and setting a pattern by generating an order of the generated keys;
    sharing at least one of the pattern, a public key, and a pre-master secret key with a receiving device through a handshaking process;
    generating a ciphertext block and a message authentication code by dividing the plaintext message into a plurality of plaintext blocks and selecting a key, among the generated keys, for each plaintext block in accordance with an order of the pattern; and
    when the generated ciphertext block has a predetermined size or larger, dividing the generated ciphertext block into a header corresponding to a predetermined size and a tail corresponding to the rest, generating the header as a ciphertext block, and adding the tail with a next plaintext block to be block-encrypted.

8. The block cipher method according to claim 7, further comprising:
    transmitting the ciphertext block and the message authentication code corresponding to each plaintext block to the receiving device.

* * * * *